Aug. 9, 1927.
H. L. CHRISTIE
1,638,526
COPING AND PUNCHING MACHINE
Filed Feb. 2, 1927    2 Sheets-Sheet 2
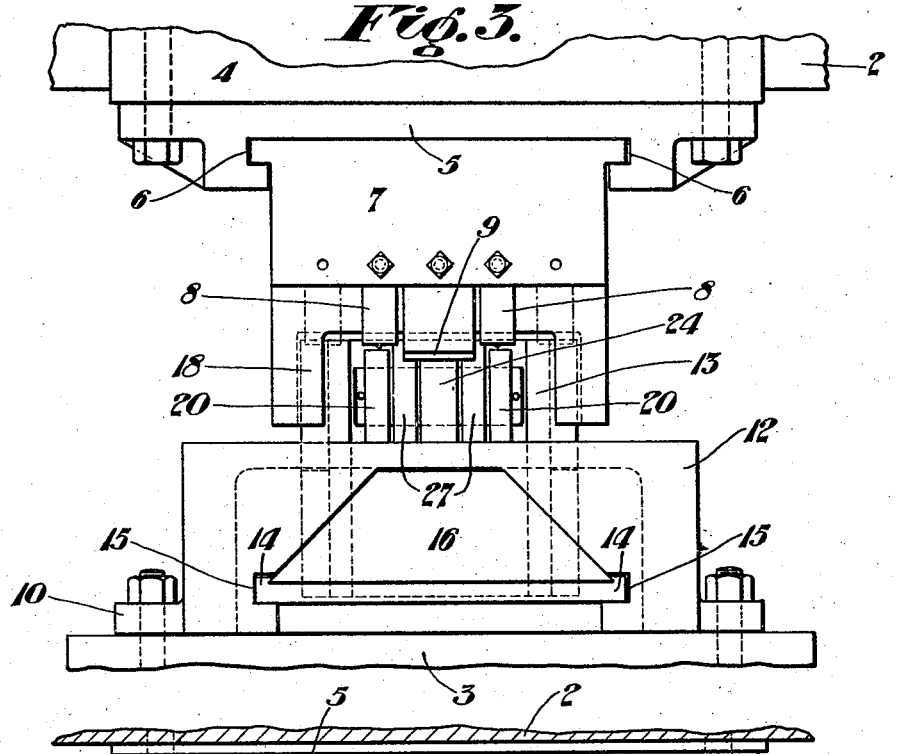
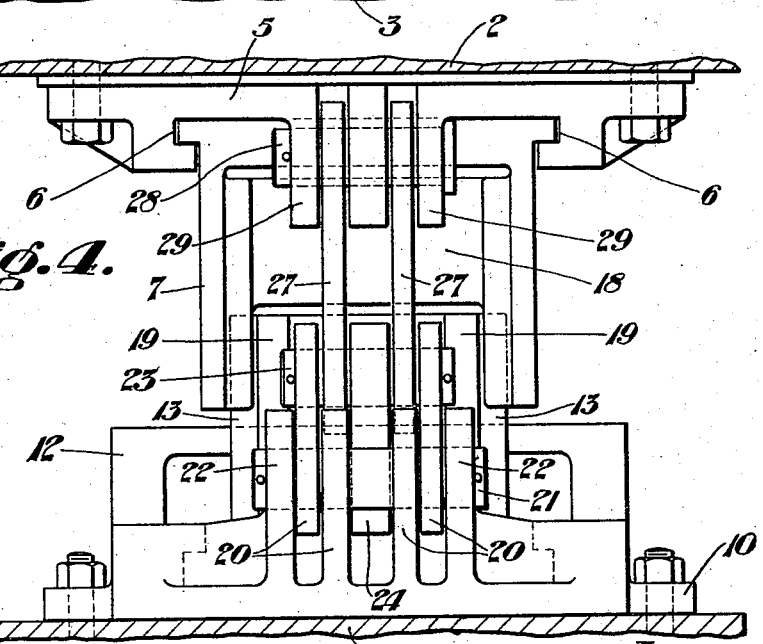
Witnesses:
Edwin Trueb
Inventor:
HANS L. CHRISTIE,
by D. Anthony Usina
his Attorney.

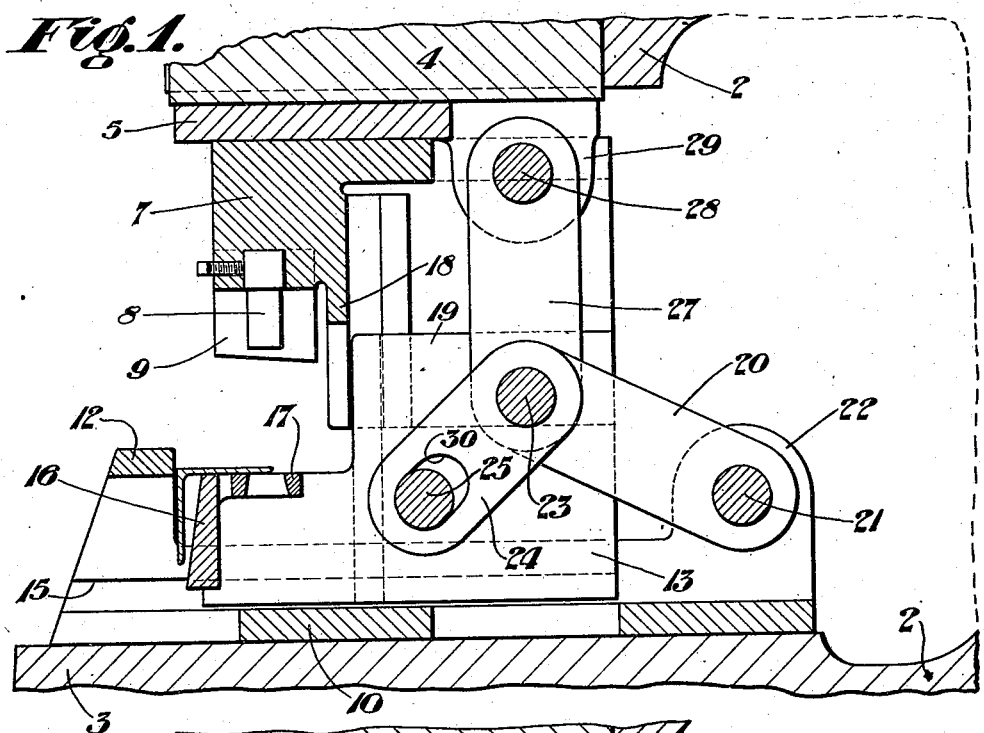
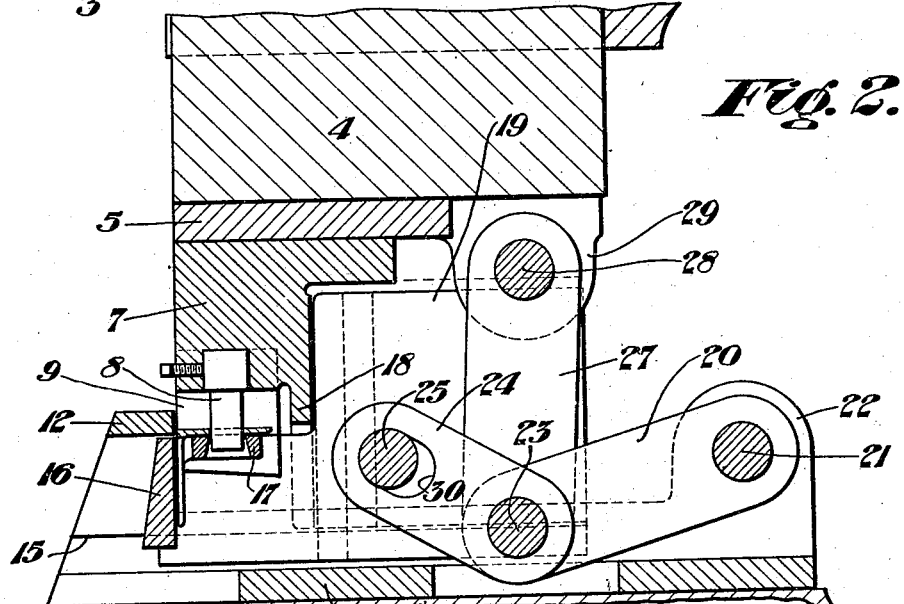

Patented Aug. 9, 1927.

1,638,526

UNITED STATES PATENT OFFICE.

HANS L. CHRISTIE, OF LOS ANGELES, CALIFORNIA.

COPING AND PUNCHING MACHINE.

Application filed February 2, 1927. Serial No. 165,409.

This invention relates to metal cutting machines and, while not limited thereto, relates more particularly to machines for cutting and punching rolled metal shapes such as angles, and has for one of its objects the provision of a machine that will cope, clip and punch angles in one stroke.

Another object is to provide mechanism constructed in accordance with this invention which may be applied to standard punching machines, thereby eliminating the necessity of providing new machines for carrying out this invention.

A further object is to provide mechanism having the novel design, construction and combination of parts hereinafter described and illustrated in the accompanying drawings.

In the drawings—

Figure 1 is a partial sectional side elevation of a machine embodying my invention showing the parts in their uppermost position.

Figure 2 is a similar view showing the parts in their lowermost position.

Figure 3 is a front elevation of the machine of Figures 1 and 2.

Figure 4 is a rear elevation thereof.

Referring more particularly to the drawings, the numeral 2 designates the housing of a standard punching machine having the usual stationary bed 3 and a vertically reciprocating plunger or ram 4.

A guide head 5 is bolted or otherwise rigidly secured to the ram 4 and is provided with undercut guideways 6 in which a combined shear and punch head 7 is slidably mounted for transverse sliding movement from front to rear relative to the ram. The shear and punch head 7 will also, of course, move vertically with the ram 4. A plurality of punch members 8 and a shear blade 9 are removably mounted in the head 7 forming a combined shear and punch member.

A base member 10 is bolted or otherwise rigidly secured to the bed 3 of the punching machine. A die block 12 is integrally formed along the forward edge of the base 10 for a purpose to be described.

A combined shear blade and die holder 13 is slidably mounted on said base for transverse movement from front to rear of said base and is provided with guide flanges 14 which engage in undercut guideways 15 in the base.

A coping shear blade 16 and a horizontal die 17 are mounted on the holder 13. The shear blade 16 is adapted to cooperate with the die block 12 during the transverse movement of the holder 13 to cope or shear the one flange of an angle or other work-piece, and the die 17 is adapted to cooperate with the shear blade 9 and punch members 8 to shear and punch the other flange of the angle or work-piece.

The head 7 is provided with a depending skirt portion 18 which fits around an upstanding rim or wall 19 on the holder 13 so that the head 7 and holder 13 are compelled to move transversely in unison, and the head 7 is free to move vertically relative to the holder 13.

The head 7 and holder 13 are adapted to be moved transversely from front to rear by the ram 4, and a toggle and link connection formed by the pair of toggle levers 20, 20. The levers 20, 20 are pivotally mounted by one end on a pin 21 mounted in lugs 22 on the base 10 and have their other end pivotally mounted on a pin 23. A toggle lever 24 has one end pivotally mounted on the pin 23 and its other end pivotally mounted on a pin 25 which is mounted in the walls 19 on the holder 13. A pair of links 27 have one end pivotally mounted on a pin 28 which is pivotally mounted in lugs 29 on the guide head 5 and have their other end pivotally mounted on the pin 23 so that vertical movement of the ram 4 and head 5 will move the links 27 and operate the toggle levers 20 and 24 to cause the head 7 and holder 13 to move transversely.

The toggle lever 24 has a slotted connection 30 with the pin 25 so as to provide for lost motion at the beginning and end of the down stroke of the ram 4 and at the beginning of the up stroke of the ram.

In operation the parts being assembled and the ram 4 being in its uppermost position, an angle work-piece is mounted on the die 17 with one flange overlying the die and its other flange projecting downwardly in front of the shear blade 16 and between said blade and the die 12. The punch is then operated to lower the ram 4 and as the ram moves downward the links 27 will be moved down to depress the toggle levers 20 and 24. As the levers 20 and 24 are depressed toward the horizontal, the head 7 and holder 13 will be compelled to move forwardly and the coping shear blade will be forced to cut the downwardly extending flange of the angle work-piece. While the head 7 and holder 13 are being forced forward, the head 7 will also be moving downward toward the other flange of the angle work-piece, so that as the coping blade completes its shearing operation and the toggle levers 20 and 24 are in a horizontal position the clipping shear blade 9 and punches 8 will engage the flange of the angle overlying the die 17. Continued downward movement of the ram 4 will force the shear blade 9 and punches 8 through the flange of the angle and will also depress the toggle levers 20 and 24 below the horizontal. However, due to the lost motion connection 30, the toggle levers are free to move below the horizontal without exerting any force on the head 7 and holder 13 and these members will remain stationary during this movement of the toggles, except for the vertical movement of the head 7 as it moves the shear blade 9 and punches 8 through the work-piece.

On the return or up stroke of the ram 4, the toggle levers will have a free movement until after the shear blade 9 and punches 8 have cleared the die 17 and work-piece, when they will exert a pull on the holder 13 and return the holder 13 and head 7 to starting position.

From the above it will be readily understood that the novel mechanism herein described will operate to cope, clip and punch angle iron members, such as used in fabricating various structures, in one operation and without handling or turning the work-piece.

While I have described and illustrated one preferred form of my invention, it will be understood that I do not wish to be limited thereto since various modifications may be made without departing from the scope of my invention as defined in the appended claims.

I claim—

1. A machine for coping, punching and clipping rolled metal shapes, comprising a base, a reciprocating member adapted to move at right angles to the plane of said base, a punch and shear blade carried by said reciprocating member and movable therewith and transversely relative thereto, a shear blade and die member mounted for transverse movement on said base parallel with the transverse movement of said punch and shear blade carried by said reciprocating member, said shear blade and die member being adapted to be moved into position to shear a portion of the work-piece and to locate said die prior to the engagement of said first named shear blade and punch with said work-piece, and means for moving said shear blade and punch and said shear blade and die transversely.

2. A machine for coping, punching and clipping rolled metal shapes, comprising a base, a reciprocating member adapted to move at right angles to the plane of said base, a punch and shear blade carried by said reciprocating member and movable therewith and transversely relative thereto, a shear blade and die member mounted for transverse movement on said base parallel with the transverse movement of said punch and shear blade carried by said reciprocating member, said shear blade and die member being adapted to be moved into position to shear a portion of the work-piece and to locate said die prior to the engagement of said first named shear blade and punch with said work-piece, and means operable by said reciprocating member for moving said shear blade and punch and said shear blade and die transversely.

3. A machine for coping, punching and clipping rolled metal shapes, comprising a base, a reciprocating member adapted to move at right angles to the plane of said base, a punch and shear blade carried by said reciprocating member and movable therewith, a shear blade and die member mounted for transverse movement on said base, said shear blade and die member being adapted to be moved into position to shear a portion of the work-piece and to locate said die prior to the engagement of said shear blade and punch with said work-piece, and means for moving said shear blade and die transversely of said base.

4. A machine for coping, punching and clipping rolled metal shapes, comprising a base, a reciprocating member adapted to move at right angles to the plane of said base, a punch and shear blade carried by said reciprocating member and movable therewith, a shear blade and die member mounted for transverse movement on said base, said shear blade and die member being adapted to be moved into position to shear a portion of the work-piece and to locate said die prior to the engagement of said shear blade and punch with said work-piece, and means operable by said reciprocating member for moving said shear blade and die transversely of said base.

5. A machine for coping, punching and clipping angle shapes and similar work-pieces, comprising a horizontal base, a vertically reciprocating ram above said base, a combined punch and shear blade member carried by said ram and movable therewith and transversely relative thereto, a combined shear blade and die member mounted for transverse movement on said base parallel with the transverse movement of said combined punch and shear blade member, said combined shear blade and die member being adapted to support the work-piece, a die rigid with said base and adapted to cooperate with the shear blade of said combined shear blade and die member to shear one flange of the work-piece when said combined shear blade and die member is moved transversely in a forward direction, and means operable by said ram for moving said combined shear blade and punch and said combined shear blade and die members transversely in unison during the vertical movement of said ram.

6. A machine for coping, punching and clipping angle shapes and similar work-pieces, comprising a horizontal base, a vertically reciprocating ram above said base, a combined punch and shear blade member carried by said ram and movable therewith and transversely relative thereto, a combined shear blade and die member mounted for transverse movement on said base parallel with the transverse movement of said combined punch and shear blade member, said combined shear blade and die member being adapted to support the work-piece, a die rigid with said base and adapted to cooperate with the shear blade of said combined shear blade and die member to shear one flange of the work-piece when said combined shear blade and die member is moved transversely in a forward direction, said combined shear blade and die member being arranged to shear said work-piece prior to and remain stationary while said combined shear blade and punch member operates on the other flange of said work-piece, and means operable by said ram for moving said combined shear blade and punch and said combined shear blade and die members transversely in unison during the vertical movement of said ram, said means having a lost motion so that said members moved thereby will remain stationary during the working part of the stroke of said ram.

7. A machine for coping, punching and clipping angle shapes and similar work-pieces, comprising a horizontal base, a vertically reciprocating ram above said base, a combined punch and shear blade member carried by said ram and movable therewith and transversely relative thereto, a combined shear blade and die member mounted for transverse movement on said base parallel with the transverse movement of said combined punch and shear blade member, said combined shear blade and die member being adapted to support the work-piece, a die rigid with said base and adapted to cooperate with the shear blade of said combined shear blade and die member to shear one flange of the work-piece when said combined shear blade and die member is moved transversely in a forward direction, and a link and toggle levers operable by said ram for moving said combined shear blade and punch and said combined shear blade and die members transversely in unison during the vertical movement of said ram.

8. A machine for coping, punching and clipping angle shapes and similar work-pieces, comprising a horizontal base, a vertically reciprocating ram above said base, a combined punch and shear blade member carried by said ram and movable therewith and transversely relative thereto, a combined shear blade and die member mounted for transverse movement on said base parallel with the transverse movement of said combined punch and shear blade member, said combined shear blade and die member being adapted to support the work-piece, a die rigid with said base and adapted to cooperate with the shear blade of said combined shear blade and die member to shear one flange of the work-piece when said combined shear blade and die member is moved transversely in a forward direction, said combined shear blade and die member being arranged to shear said work-piece prior to and remain stationary while said combined shear blade and punch member operates on the other flange of said work piece, means connecting said combined shear blade and punch member and said combined shear blade and die member so as to cause said members to move transversely in unison and permit said combined shear blade and punch member to move vertically relative to said combined shear blade and punch member and said combined shear blade and die member transversely.

In testimony whereof, I have hereunto signed my name.

HANS L. CHRISTIE.